United States Patent
Brosowsky

(10) Patent No.: US 12,423,554 B2
(45) Date of Patent: Sep. 23, 2025

(54) METHOD FOR DETERMINING SAFETY-CRITICAL OUTPUT VALUES BY WAY OF A DATA ANALYSIS DEVICE FOR A TECHNICAL ENTITY

(71) Applicant: Dr. Ing. h.c. F. Porsche Aktiengesellschaft, Stuttgart (DE)

(72) Inventor: Mathis Brosowsky, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 995 days.

(21) Appl. No.: 17/492,777

(22) Filed: Oct. 4, 2021

(65) Prior Publication Data

US 2022/0114416 A1    Apr. 14, 2022

(30) Foreign Application Priority Data

Oct. 14, 2020    (DE) ...................... 10 2020 127 051.8

(51) Int. Cl.
*G06N 3/04*    (2023.01)
*G06N 3/08*    (2023.01)

(52) U.S. Cl.
CPC ................. *G06N 3/04* (2013.01); *G06N 3/08* (2013.01)

(58) Field of Classification Search
CPC .................................. G06N 3/08; G06N 3/04
See application file for complete search history.

(56) References Cited

U.S. PATENT DOCUMENTS 10,007,269 B1    6/2018    Gray
11,861,492 B1 *  1/2024    Hsu ...................... G06N 3/0495
(Continued)

FOREIGN PATENT DOCUMENTS

CN    106779084 A    5/2017
CN    108885764 A    11/2018
(Continued)

OTHER PUBLICATIONS

Wang, Shiqi, et al. "Efficient formal safety analysis of neural networks." Advances in neural information processing systems 31 (2018). (Year: 2018).*

(Continued)

*Primary Examiner* — Hal Schnee
(74) *Attorney, Agent, or Firm* — Buchanan Ingersoll & Rooney PC

(57) ABSTRACT

A method for determining safety-critical output values by way of a data analysis device for a technical entity. The method includes receiving data and/or measured values for the entity by way of the data analysis device. The method further includes processing the input values (x) by way of the data analysis device using a software application in order to determine at least one first output value ($y_1$). The method further includes using a neural network having a plurality of layers ($h_\theta(x)$) with first learnable parameters ($\theta$); modifying a layer of the neural network using a function ($\varphi$) so that the output value ($y_1$) is located within a defined value range ($C(s)$) of at least one target parameter (s); and determining the target parameter (s) and/or the value range ($C(s)$) of the target parameter (s) using further additional layers ($k_\beta(x)$) of the neural network with second learnable parameters ($\beta$).

14 Claims, 4 Drawing Sheets

(56) References Cited

U.S. PATENT DOCUMENTS

| | | | |
|---|---|---|---|
| 2018/0173240 A1* | 6/2018 | Fang | G05D 1/0212 |
| 2018/0300816 A1 | 10/2018 | Perl et al. | |
| 2018/0373263 A1* | 12/2018 | Gray | G06V 20/58 |
| 2020/0175378 A1 | 6/2020 | McDonnell et al. | |
| 2020/0349444 A1 | 11/2020 | Yaguchi | |
| 2021/0354718 A1 | 11/2021 | Lu et al. | |

FOREIGN PATENT DOCUMENTS

| | | |
|---|---|---|
| CN | 111242296 A | 6/2020 |
| DE | 10113538 A1 | 9/2002 |
| DE | 102019105850 A1 | 4/2019 |
| KR | 20180088789 A | 8/2018 |
| KR | 20200096411 A | 8/2020 |
| WO | 2019142241 A1 | 7/2019 |

OTHER PUBLICATIONS

Amos, Brandon, and J. Zico Kolter. "Optnet: Differentiable optimization as a layer in neural networks." International conference on machine learning. PMLR, 2017. (Year: 2017).*

Hoon Chung, Sung Joo Lee and Jeon Gue Park, "Deep neural network using trainable activation functions, " 2016 International Joint Conference on Neural Networks (IJCNN), 2016, pp. 348-352. (Year: 2016).*

Korean Notice of Preliminary Rejection for Korean Application No. 10-2021-0133735, dated May 24, 2023 with translation, 7 pages.

Brosowsky, et al., "Sample-Specific Output Constraints for Neural Networks", Mar. 23, 2020, pp. 1-8, FZI Research Center for Information Technology, Karlsruhe, Germany, Retrieved from the Internet: https://arxiv.org/abs/2003.10258v1.

Rieke, J., "Object Detection with Neural Networks—A Simple Tutorial Using Keras", 2017, pp. 1-11, Towards Data Science, Retrieved from the Internet: https://towardsdatascience.com/object-detection-with-neural-networks-a4e2c46b4491.

Fujimoto et al., "Addressing Function Approximation Error in Actor-Critic Methods", 2018, pp. 1-10, Retrieved from the Internet: https://arxiv.org/abs/1802.09477v3.

Office Action issued Apr. 24, 2025 by the State Intellectual Property Office in corresponding Japanese Patent Application No. 202111200855.5 and an English translation of the Office Action. (15 pages).

* cited by examiner

METHOD FOR DETERMINING SAFETY-CRITICAL OUTPUT VALUES BY WAY OF A DATA ANALYSIS DEVICE FOR A TECHNICAL ENTITY

CROSS-REFERENCE TO RELATED APPLICATION

This application claims priority to German Patent Application No. 10 2020 127 051.8, filed Oct. 14, 2020, the content of such application being incorporated by reference herein in its entirety.

FIELD OF THE INVENTION

The invention relates to a method and to a system for determining safety-critical output values by way of a data analysis device for a technical entity, in particular a motor vehicle.

BACKGROUND OF THE INVENTION

In the field of automated driving, safety-relevant functions are completely self-controlled by the vehicle in certain application cases. Since the traffic scene is no longer being monitored by the driver of the vehicle, these functions have to be perfectly protected against faults.

In the case of automated safety monitoring of a technical entity such as a motor vehicle, the nature of individual components, right up to the entire entity, is for example assessed in order to avoid damage, plan maintenance and hence reduce costs. To this end, it may be expedient to define indices and characteristic values for measured values that have to be complied with and the overshoot or undershoot of which may be linked to a fault alarm. The measured values may be optical or acoustic data, such as for example damaging frequencies in the operating state of a component or drivetrain or optical data within the scope of facial recognition or automated distance monitoring in a motor vehicle or the calculation of permitted trajectories. Calculation algorithms are defined and configured for the obtained measured data, in order for example to obtain information about excitation and/or damage frequencies or information about a person or surroundings therefrom. These key factors such as key performance indices may then be monitored in order to provide timely identification of possible damage arising in the technical entity and the individual components if changes occur. However, these various steps in an analysis chain and/or calculation chain require a very high degree of expert know-how and, moreover, are complex and time-consuming from a mathematical point of view.

DE 101 13 538 B4, which is incorporated by reference herein, describes a closed-loop control apparatus having a loop controller that receives an input variable and determines a manipulated variable therefrom, the latter being fed to an actuator of a controlled system. A neural correction encoder is provided, which receives a process variable from the controlled system, some of the loop controller input variables and some of the manipulated variables determined by the loop controller and which generates a correction signal from these input variables.

DE 10 2019 105850 A1, which is incorporated by reference herein, describes a method for generating a reduced neural network for a controller of a vehicle and/or of a vehicle component. A first data field of a first neural network is read, and the reduced neural network is generated with the aid of the first data field.

SUMMARY OF THE INVENTION

Described herein is a method, system and computer program product for determining safety-critical output values by way of a data analysis device for a technical entity, distinguished by high reliability and efficient use of computing capacities.

According to a first aspect, the invention relates to a method for determining safety-critical output values $y_1$, $y_2, \ldots, y_n$ by way of a data analysis device for a technical entity, comprising:
  receiving data and/or measured values for the entity and/or the surroundings of the entity by way of the data analysis device, wherein the data/measured values describe at least one state and/or at least one feature of the entity and/or the surroundings of the entity and constitute input values;
  processing the input values x by way of the data analysis device using a software application in order to determine at least one first output value $y_1$, comprising the following method steps:
  using a neural network having a plurality of layers $h_\theta(x)$ with first learnable parameters $\theta$;
  modifying the last layer or an additional layer of the neural network using a function $\varphi$, so that the output value $y_1$ is located within a defined value range $C(s)$ of at least one target parameter s;
  determining the target parameter s and/or the value range $C(s)$ of the target parameter s using further additional layers $k_\beta(x)$ of the neural network with second learnable parameters $\beta$.

In one further development, provision is made for the target parameter s and/or the value range $C(s)$ to constitute at least one second output value $y_2$.

Advantageously, a representation $g(s)$ formed from the target parameter s is passed to the neural network as a further input value such that a calculation value z of the neural network also depends on the target parameter s.

In one embodiment, provision is made for a noise component $\Delta s$ to be added to the determined target parameter s, the noise component $\Delta s$ being a random number with the same dimension as the parameter s.

In one development of the invention, provision is made for learnable parameters $\gamma$ to be used separately or jointly to determine the first output value $y_1$ and the second output value $y_2$.

Use is made in particular of a database that stores data relating to the properties of the technical entity, images and characteristic variables and the links between them.

Provision is advantageously made for the technical entity to be a motor vehicle.

According to a second aspect, the invention relates to a system for determining safety-critical output values $y_1$, $y_2, \ldots, y_n$ for a technical entity with a data analysis device, wherein the data analysis device is designed to receive data and/or measured values for the entity and/or the surroundings of the entity to the data analysis device, wherein the data/measured values describe at least one state and/or at least one feature of the entity and/or the surroundings of the entity and constitute input values x. The input values x are processed by the data processing device using a software application in order to determine at least one first output value $y_1$, comprising the following method steps:
  using a neural network having a plurality of layers $h_\theta(x)$ with first learnable parameters $\theta$;
  modifying the last layer or an additional layer of the neural network using a function $\varphi$, so that the output value $y_1$ is located within a defined value range $C(s)$ of at least one target parameter s;

determining the target parameter s and/or the value range $C(s)$ of the target parameter s using further additional layers $k_\beta(x)$ of the neural network with second learnable parameters $\beta$.

In one development, provision is made for the target parameter s and/or the value range $C(s)$ to constitute at least one second output value $y_2$.

In one embodiment, a representation $g(s)$ formed from the target parameter s is passed to the neural network as a further input value such that a calculation value z of the neural network also depends on the target parameter s.

Provision is advantageously made for a noise component $\Delta s$ to be added to the determined target parameter s, the noise component $\Delta s$ being a random number with the same dimension as the target parameter s.

Learnable parameters $\gamma$ are in particular used separately or jointly to determine the first output value $y_1$ and the second output value $y_2$.

In one embodiment, provision is made for use to be made of a database that stores data relating to the properties of the technical entity, images and characteristic variables and the links between them.

The technical entity is advantageously a motor vehicle.

According to a third aspect, the invention relates to a computer program product comprising an executable program code that is configured such that, when it is executed, it carries out the method according to the first aspect.

BRIEF DESCRIPTION OF THE DRAWINGS

The invention is explained in more detail below with reference to an exemplary embodiment illustrated in the drawing.

In the figures.

Additional features, aspects and advantages of the invention or its exemplary embodiments will become apparent from the detailed description in conjunction with the claims.

DETAILED DESCRIPTION OF THE INVENTION

Figure 1:
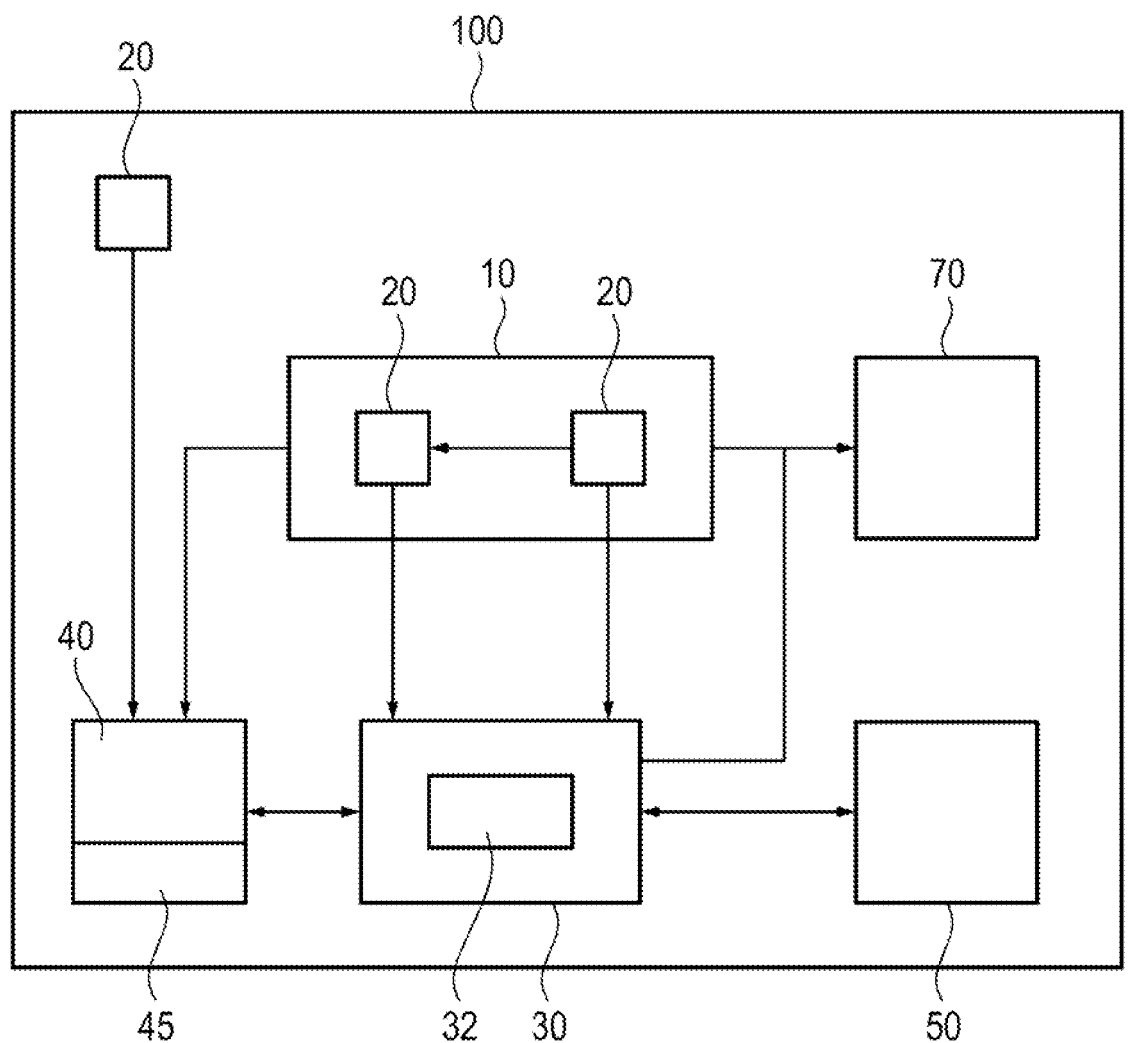
FIG. 1 shows a schematic illustration of a system according to aspects of the invention for determining safety-critical output values for a technical entity.

FIG. 1 shows a system 100 for determining safety-critical output values by way of a data analysis device 20 for an entity 10. The entity 10 may for example be a motor vehicle. The entity 10 is provided with sensors 20 that record acoustic, optical, chemical and/or other measured values in the form of data. By way of example, the sensors 20 may be pressure sensors, piezo-sensors, rotational speed sensors, temperature sensors and/or image-recording sensors such as cameras. The sensors 20 forward the measured values and data to the data analysis device 30, such that they constitute input values x. The data analysis device 30 preferably has a processor 32 that processes the input values x by way of a software application with an algorithm. However, it is also conceivable for the data to initially be stored in a storage unit 40 or a software module 45 and only be processed by the data analysis device 30 at a later time. The data analysis device 30 may additionally access one or more other databases 50. The database 50 may for example store information or data with regard to the properties of the entity 10, and also images and characteristic variables. Exemplary properties are rotational frequencies or the torque of the motor at a particular speed. Moreover, images, for example from the surroundings of the entity 10, may be downloaded from the database 50. However, it is also conceivable for construction plans of the entity 10, such as for example of a bearing of a transmission or of the motor, to be stored in the database 50. Moreover, target variables and target values that define a safety standard may be stored in the database 50. Moreover, provision may be made for a user interface 70, which may be designed as a display, for outputting the calculation results.

In the context of the invention, a "processor" may be understood to mean for example a machine or an electronic circuit. In particular, a processor may be a central processing unit (CPU), a microprocessor or a microcontroller, for example an application-specific integrated circuit or digital signal processor, possibly in combination with a storage unit for storing program commands, etc. A processor may also be understood to be a virtualized processor, a virtual machine or soft CPU. By way of example, this may also be a programmable processor that is equipped with configuration steps for carrying out the specified method according to aspects of the invention or is configured by configuration steps such that the programmable processor implements the inventive features of the method, of the component, of the modules or other aspects and/or partial aspects of the invention.

In the context of the invention, a "storage unit" or "storage module" and the like may be understood to mean for example a volatile memory in the form of random access memory (RAM) or a permanent memory such as a hard drive or a data carrier or for example an interchangeable storage module. However, the storage module may also be a cloud-based storage solution.

In the context of the invention, a "module" may be understood to mean for example a processor and/or a storage unit for storing program commands. By way of example, the processor is specifically designed to execute the program commands such that the processor carries out functions to implement or realize the method according to aspects of the invention or a step of the method according to aspects of the invention.

Figure 7:
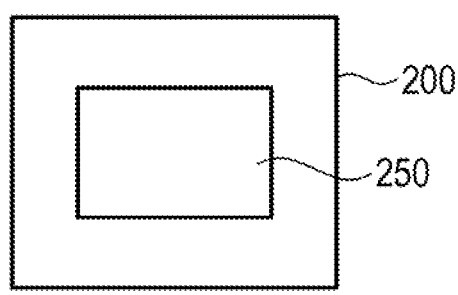
FIG. 7 shows a computer program product according to an embodiment of the fourth aspect of the invention.

FIG. 7 depicts computer program product 200 having a program code 250.

In the context of the invention, "measured values" should be understood to mean both raw data and already prepared data from the measurement results from the sensors 20.

Figure 2:
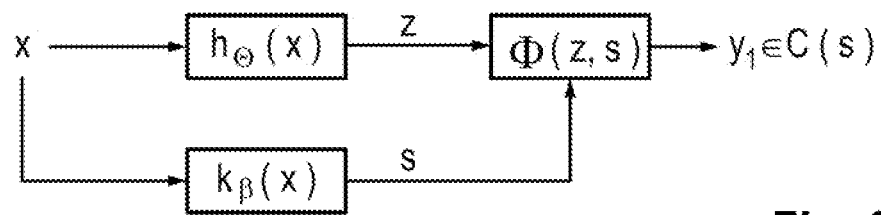
FIG. 2 shows a first exemplary embodiment of a neural network according to aspects of the invention.

FIG. 2 illustrates the modeling of a neural network with dynamic restrictions according to aspects of the invention. According to aspects of the present invention, the data analysis device 30, in order to process the input values x, uses a modified architecture of an artificial neural network with the property of restricting the value range of at least one first output value $y_1$ in a targeted manner for input values x in each forward computing step. The input values x are preferably the data of the measured values from the sensors 20. Input values x from the database 50 or other sources may however also be used.

A neural network with a known architecture consisting of various layers $h_\theta(x)$ with learnable parameters $\theta$ is combined with an extending function $\varphi$ in order to control the restriction to the output value range $C(s)$. The function $\varphi$ maps the calculation value z of the neural network onto the value range $C(s)$ dependent on a target parameter s. The function $\varphi$ itself does not contain any learnable parameters $\theta$.

In this case, according to aspects of the invention, at least one target parameter s is determined by additional layers $s=k_\beta(x)$ of the neural network with dedicated learnable parameters $\beta$ from the input values x. This target parameter s determined by the neural network may thus be considered to be an additional input value. The target parameter s is thus learned by way of the neural network based on the input values and is thus itself determined through calculation as it were, and not through external specifications.

The target parameter s defines a subset $C(s)$ of the maximum output set D of the neural network. $\theta$ preferably denotes the learnable parameters of the neural network, but they may also constitute any other parameters. The first output values $y_1$ are defined as:

$$y_1 = f_\theta(x,s) \in C(s) \subseteq D$$

wherein $$\forall x \in X \forall s \in S \forall \theta \in W$$

Defining the architecture of the neural network according to aspects of the invention in this way determines that the output values $y_1=f_\theta(x,s)$ of the neural network are located only in the output set $C(s)$. Within the scope of the present invention, neural networks with this architecture are referred to as neural networks with dynamic restrictions. The known architecture of neural networks is used and modified by the function $\varphi$ such that the output value $y_1$ is located within a defined output value range $C(s)$. Known neural networks may in this case be applied as training algorithms. This applies in particular to gradient-based optimization methods and classification methods, which may be used for the neural networks according to aspects of the invention with dynamic restrictions. The use of known training algorithms for the neural network according to aspects of the invention is advantageous in that additional safety properties may be added. For gradient-based learning methods to be able to be applied, it is advantageous for the function $\phi(z,s)$ to be differentiable not only in z, but also additionally in s.

The target parameter s, which is determined by the additional layers $s=k_\beta(x)$ of the neural network, and the value range $C(s)$ assigned thereto may form a second output value $y_2$ of the neural network.

The present invention thus creates a neural network with dynamic restrictions by virtue of modifying neural networks with a known architecture in a specific fashion. The neural network according to aspects of the invention maps each first output value $y_1$ within a defined value range $C(s)$, which was defined for a specific parameter s. Unexpected output values, as usually occur in known neural networks, may therefore be avoided. By contrast, the neural network according to aspects of the invention supplies output values located within the value range $C(s)$ and is therefore applied deterministically in terms of its structure. The parameter s and the value range $C(s)$ are determined by way of additional layers $s=k_\beta(x)$ of the neural network based on the input values x. The target parameter s and thus the value range $C(s)$ assigned thereto are thus determined based on the input values x.

Figure 3:
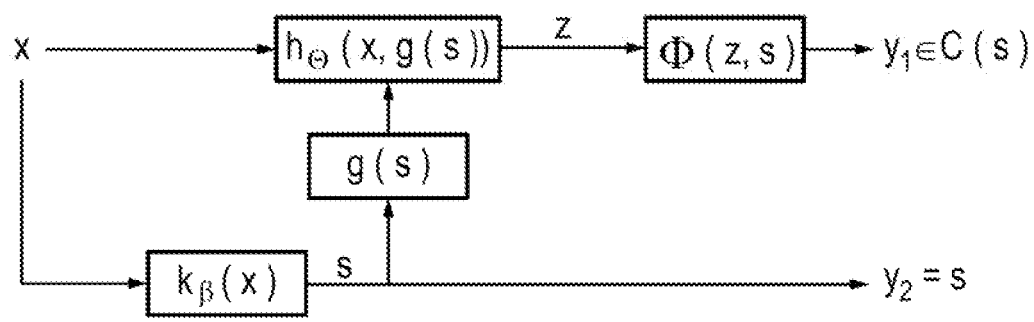
FIG. 3 shows a second exemplary embodiment of a neural network according to aspects of the invention.

FIG. 3 illustrates an expansion of the neural network according to aspects of the invention, in which a representation g(s) of the parameter s is supplied to the neural network. The calculation value z of the neural network is thus dependent on the target parameter s itself if representations g(s) formed from the target parameters are passed to the neural network as further input values x. The function $\varphi(z,s)$ is then applied to the calculation value $z=h_\theta(x,g(s))$ of the neural network and maps the output value $y_1$ of the neural network onto the value range $C(s)$. If the function $\varphi$ is additionally differentiable in z, gradient-based optimization methods may thus be applied to this neural network according to aspects of the invention.

The following therefore applies:

$$\forall s \in S \ \forall z \in Z : \phi(z,s) \in C(s)$$
$$\Rightarrow \forall x \in X \ \forall s \in S \ \forall \theta \in W : y = \phi(h_\theta(x, g(s)), s) \stackrel{def}{=} f_\theta(x, s) \in C(s)$$

This is expedient when a plurality of target parameters $s_i$, and thus a plurality of restricted value ranges $C(s_i)$, are used for one or more input values x. When using a representation g(s), an intermediate variable z is also dependent on the target parameter s. For gradient-based learning methods to be able to be applied, it is advantageous for the representation g(s) to be differentiable.

FIG. 3 furthermore illustrates that the target parameter s and the value range $C(s)$ assigned thereto form a second output value $y_2$ of the neural network.

By virtue of the target parameter s being determined by the neural network itself, interpretability is increased, since the learned target parameter s describes an interpretable restriction of the output $C(s)$. For instance, in image processing, the determined target parameter s may constitute a region in a two-dimensional image region that covers the output values $y_1$ of the neural network. This could for example be a bounding box around the face of a person when the neural network is tasked with locating particular orientation points (landmarks) on the face, such as for example the tip of the nose.

Since the determined target parameter s constitutes another output $y_2$ of the neural network, it is possible to use multi-task learning algorithms. In this case, the simultaneous the simultaneous learning of different output values $y_1$, $y_2, \ldots, y_n$ may boost performance.

Since the output values $y_1, y_2, \ldots, y_n$ are consistent with respect to the restriction to the value range $C(s)$, it is possible to take into consideration correlations between the various output values $y_1, y_2, \ldots, y_n$. In the field of image processing, the bounding box and the landmarks are therefore not predicted independently of one another, but rather such that the bounding box also comprises the landmarks on the face in a guaranteed manner.

Figure 4:
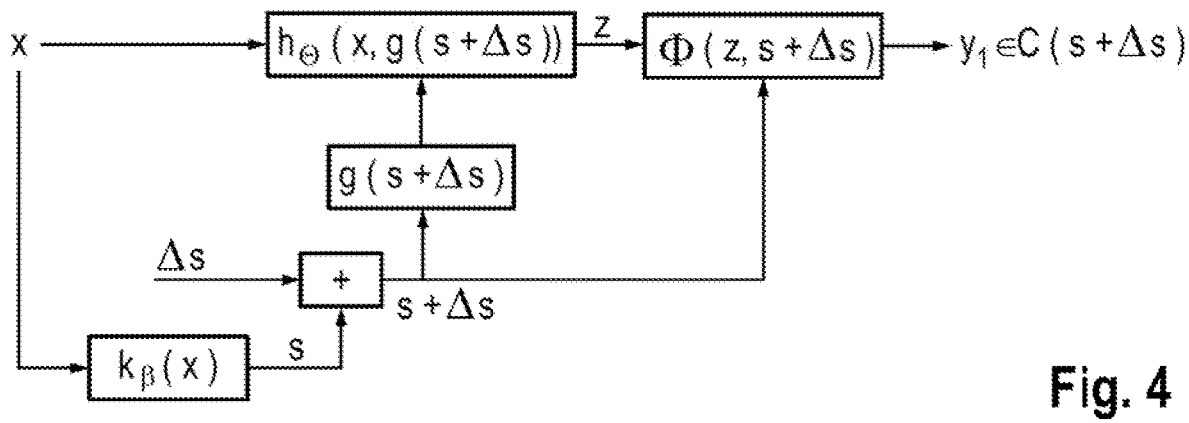
FIG. 4 shows a third exemplary embodiment of a neural network according to aspects of the invention.

As illustrated in FIG. 4, in one further development, provision may be made to add a noise component $\Delta s$ to the determined target parameter s. $\Delta s$ is a random number with the same dimension as the parameter s, with its absolute value being restricted to $\|s\|<\varepsilon$. This makes it possible to achieve a robust prediction for various regions $y_1 \in C(s+\Delta s)$ with variable restrictions in terms of their form. This also does not affect the differentiability and thus the application of gradient-based learning methods.

Figure 5:
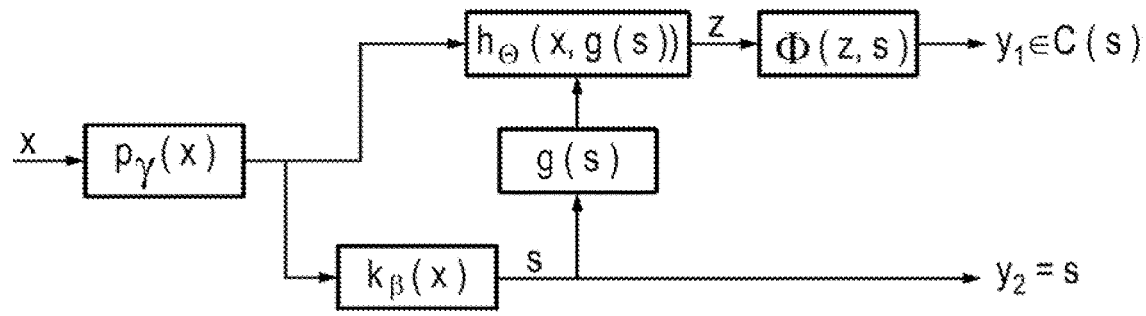
FIG. 5 shows a fourth exemplary embodiment of a neural network according to aspects of the invention.

FIG. 5 illustrates that learnable parameters γ are used separately or jointly to determine the first output value $y_1 \in C(s)$ and the second output value $y_2=s$.

Since neural networks are usually of multidimensional design, the modeling of a neural network with dynamic restrictions according to aspects of the invention is described below in relation to the restriction of the output value range to any N-dimensional convex polytope C(s) with M vertices $\{v^i\}_{i=1,\ldots,M}$. The polytope C(s) is specified as a restrictive target parameter by the coordinates of the M N-dimensional vertices $s=(v_1^1, \ldots, v_N^1, v_1^2, \ldots, v_N^2, \ldots, v_1^M, \ldots, v_N^M)$. The calculation values z in the final layer of the neural network are defined as $z=(z_1, \ldots, z_M)$. Now, the function φ is defined as follows:
or $$\phi(z, s) = \sum_{i=1}^{M} \sigma_i(z) v^i$$

$$\phi_j(z, s) = \sum_{i=1}^{M} \sigma_i(z) v_j^i$$

and is applied to the calculation values $z=(z_1, \ldots, z_M)$ and the target parameter $s=(v_1^1, \ldots, v_N^1, v_1^2, \ldots, v_N^2, \ldots, v_1^M, \ldots, v_N^M)$, where σ denotes an M-dimensional softmax function. In this case, the softmax function a transforms the M-dimensional vector z with real components into an M-dimensional vector σ(z) with likewise real components in the value range (0, 1), wherein the components of the vector σ(z) overall are summed to 1.

As a result, the following formula results for the value range C(s) of the output values (y):

$$C(s) = \left\{ y = \sum_{i=1}^{M} p_i v_i \in \mathbb{R}^N \,\middle|\, \sum_{i=1}^{M} p_i = 1, p_i > 0 \right\}$$

Therefore, if the vectors s of the convex polytope C(s) are passed to the neural network as representations g(s), the result is located, in turn, in the convex polytope C(s) under consideration.

The scope of the invention allows for further generalizations for restricting various components $z_k$ of a multidimensional output of a neural network to k different convex polytopes $C_k$, each with different dimensions and number of vertices. For the various calculation values $z_1, \ldots, z_k$, different functions $\varphi_1, \ldots, \varphi_k$ are chosen for mapping the components $Z_1, \ldots, z_k$ onto the output values $y_1, \ldots, y_k$. The convex polytopes $C_k$ may be represented by combining the coordinates of the vertices of all polytopes.

In principle, it is also conceivable to restrict the output values y of a neural network to a non-convex polytope by virtue of the non-convex polytope being divided into convex polytopes. The method according to aspects of the invention may then be performed in the convex polytope components. Additionally, softmax probabilities are used to select the polytope component that represents the best solution to a particular problem.

Such a multidimensional neural network with dynamic restrictions also makes it possible to connect a plurality of technical entities to one another. By way of example, it is thus possible to make comparisons between various vehicles of a particular vehicle type. By way of example, the data from various vehicles may be transmitted during operation thereof to a cloud in order to ascertain data analysis in relation to mean values of technical data, such as for example the behavior of the transmission after a defined mileage, by way of the algorithm of the present invention.

The invention may be used for a multiplicity of applications, such as for example motion planning in the case of an autonomously driving vehicle. The input data x may in this case be measured values from sensors in the vehicle, such as for example a camera, or use may be made of lidar, radar or ultrasound. It is also possible to use already processed measured values such as object data. The output values $y_1$ may for example constitute a trajectory on the basis of input values x with data about the temporal and spatial surroundings. The target parameter s represents the driveable region C(s) of a geographical topography. According to aspects of the invention, this target parameter s, which defines the driveable region, is determined as a further output value $y_2$ of the neural network: $y_2=s$. Since this target parameter s is determined using the neural network, it is possible to guarantee, according to aspects of the invention, that the predicted trajectory $y_1$ is located in the predicted driveable region $C(s)=C(y_2)$ and thus constitutes a consistent solution to a particular problem.

Moreover, the calculation outlay may be reduced by the modified architecture of the neural network according to aspects of the invention. It is additionally possible to use very deep neural networks, which are distinguished by high accuracy of the calculation results. This is important especially in the case of safety-critical applications, which are distinguished by low error tolerances. Different categories of restrictions may additionally be defined by the various output values $y_1, y_2, \ldots, y_n$, these relating to the respective application case.

Known neural networks that are used for calculating the motion plan of a vehicle are disadvantageous in that their behavior is predictable only with difficulty on account of their "black box character". They are therefore only of limited use for situations that have high demands in terms of safety placed thereon. In particular for uses in the field of autonomous driving, it is necessary to preclude the motion planning leading to collisions with other traffic users. By contrast, the neural network according to aspects of the invention makes it possible to preclude certain behavior patterns, such as for example the choice of a trajectory leading to a collision, by restricting the output value range C(s). For motion planning, the algorithm according to aspects of the invention allows only trajectories that avoid a collision with other vehicles that are present and detected. Since motion planning of a vehicle involves a spatial and temporal change in position of the vehicle, the output value range C(s) may be modified dynamically over time according to aspects of the invention. A movement of the vehicle is allowed only if the trajectory is located within a previously defined spatial region at a time t.

Further exemplary applications of the present invention are those of the closed-loop control of the x- and y-coordinates of a vehicle, such as for example transverse closed-loop control in the case of a lane keep assistant or longitudinal closed-loop control in the case of an adaptive cruise control (ACC). In this case, a target acceleration or a target steering angle is calculated as output value, preferably on the basis of measured data such as for example the distance to a vehicle ahead. Closed-loop control using the algorithm according to aspects of the invention may calculate lower and upper limit values for the output values on the basis of measured values as the input values. Advantageously, the behavior of the neural network is able to be trained within these limits before it is used in a vehicle.

The behavior of the neural network according to aspects of the invention is therefore not only trained implicitly in a manner known per se by way of data; instead, explicit modeling by determining the output value range C(s) is also possible. The output value range C(s) is in turn determined by the target parameter s that is calculated by way of the neural network. This leads to improved determination of the target parameter s.

Figure 6:
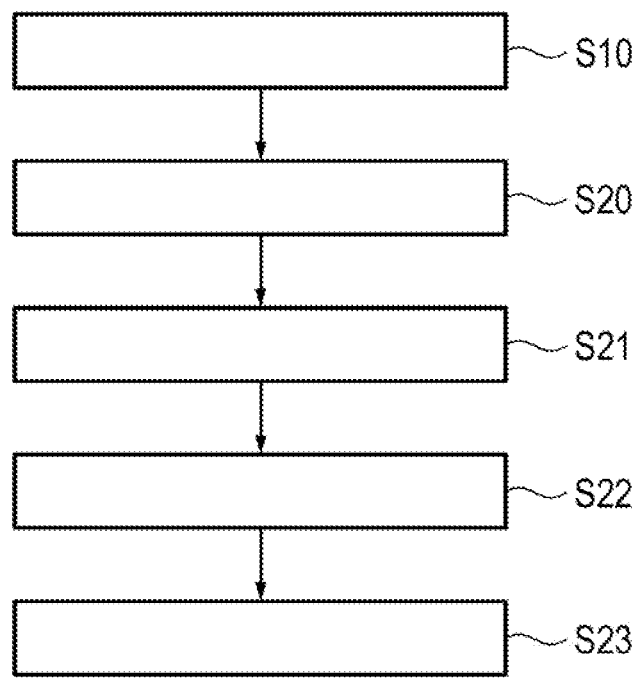
FIG. 6 shows a flowchart for explaining the individual method steps of a method according to aspects of the invention.

Turning now to FIG. 6, a method for determining safety-critical output values $y_1, y_2, \ldots, y_n$ of a technical entity 10 according to aspects of the present invention therefore comprises the following steps:

In a step S10, data and/or measured values for the entity 10 and/or the surroundings of the entity 10 are received by way of the data analysis device 30, wherein the data/measured values describe at least one state and/or one feature of the entity 10 and/or the surroundings of the entity 10 and constitute input values x.

In a step S20, the input values x are processed in the data analysis device 30 using a software application in order to determine at least one first output value $y_1$, comprising the following method steps:

In a step S21, a neural network having a plurality of layers $h_\theta(x)$ with first learnable parameters $\theta$ is used.

In a step S22, the last layer or an additional layer of the neural network is modified using a function $\varphi$, so that the output value $y_1$ is within a defined value range C(s) of at least one target parameter (s).

In a step S23, the target parameter s and/or the value range C(s) of the target parameter s is determined by further additional layers $k_\beta(x)$ of the neural network with second learnable parameters $\beta$.

REFERENCE SIGNS

10 Entity
20 Sensor
30 Data analysis device
32 Processor
40 Storage unit
45 Software module
50 Database
70 User interface
100 System
200 Computer program product
250 Program code
x Input values
y Output values

What is claimed is:

1. A method for determining safety-critical output values $(y_1, y_2, \ldots, y_n)$ by way of a data analysis device for a technical entity, said method comprising:
  receiving data and/or measured values for the entity and/or surroundings of the entity by way of the data analysis device, wherein the data/measured values describe at least one state and/or at least one feature of the entity and/or the surroundings of the entity and constitute input values (x);
  processing the input values (x) by way of the data analysis device using a software application in order to determine at least one first output value ($y_1$), said processing step comprising the following substeps:
  (i) using a neural network having a plurality of layers ($h_\theta(x)$) with first learnable parameters ($\theta$);
  (ii) modifying the last layer or an additional layer of the neural network using a function ($\varphi$) so that at least one first output value ($y_1$) of said output values ($y_1, y_2, \ldots, y_n$) is located within a defined value range (C(s)) of at least one target parameter (s); and
  (iii) determining the target parameter (s) and/or the value range (C(s)) of the target parameter (s) using further additional layers ($k_\beta(x)$) of the neural network with second learnable parameters ($\beta$).

2. The method as claimed in claim 1, wherein the target parameter (s) and/or the value range (C(s)) constitute at least one second output value ($y_2$) of said output values ($y_1, y_2, \ldots, y_n$).

3. The method as claimed in claim 1, further comprising passing a representation (g(s)) formed from the target parameter (s) onto the neural network as a further input value such that a calculation value (z) of the neural network also depends on the target parameter (s).

4. The method as claimed in claim 1, further comprising adding a noise component ($\Delta$s) to the determined target parameter (s), the noise component ($\Delta$s) being a random number with the same dimension as the parameter (s).

5. The method as claimed in claim 2, further comprising jointly or separately using learnable parameters ($\gamma$) to determine the first output value ($y_1$) and the second output value ($y_2$).

6. The method as claimed in claim 1, further comprising using a database that stores data relating to properties of the technical entity, images and characteristic variables and the links between them.

7. The method as claimed in claim 1, wherein the technical entity is a motor vehicle.

8. A system for determining safety-critical output values $(y_1, y_2, \ldots, y_n)$ for a technical entity, said system comprising a data analysis device,
  wherein the data analysis device is configured to (i) receive data and/or measured values for the entity and/or the surroundings of the entity, wherein the data/measured values describe at least one state and/or at least one feature of the entity and/or the surroundings of the entity and constitute input values (x), and (ii) process the input values (x) using a software application in order to determine at least one first output value ($y_1$) of the output values ($y_1, y_2, \ldots, y_n$),
  wherein the data analysis device is configured to process the input values (x) by:
  (i) using a neural network having a plurality of layers ($h_\theta(x)$) with first learnable parameters ($\theta$);
  (ii) modifying a last layer or an additional layer of the neural network using a function ($\varphi$) so that the first output value ($y_1$) is located within a defined value range (C(s)) of at least one target parameter (s); and
  (iii) determining the target parameter (s) and/or the value range (C(s)) of the target parameter (s) using further additional layers ($k_\beta(x)$) of the neural network with second learnable parameters ($\beta$).

9. The system as claimed in claim 8, wherein the target parameter (s) and/or the value range (C(s)) constitute at least one second output value ($y_2$) of the output values ($y_1, y_2, \ldots, y_n$).

10. The system as claimed in claim 8, wherein the data analysis device is configured to pass a representation (g(s)) formed from the target parameter (s) to the neural network as a further input value such that a calculation value (z) of the neural network also depends on the target parameter (s).

11. The system as claimed in claim 8, wherein the data analysis device is configured to add a noise component ($\Delta$s)

to the determined target parameter (s), the noise component ($\Delta s$) being a random number with the same dimension as the parameter (s).

12. The system as claimed in claim 9, wherein the data analysis device is configured to separately or jointly use learnable parameters ($\gamma$) to determine the first output value ($y_1$) and the second output value ($y_2$).

13. The system as claimed in claim 8, wherein use is made of a database that stores data relating to properties of the technical entity, images and characteristic variables and the links between them.

14. The system as claimed in claim 8, wherein the technical entity is a motor vehicle.

* * * * *